United States Patent [19]
Burns

[11] Patent Number: 5,359,804
[45] Date of Patent: *Nov. 1, 1994

[54] FISHING BOBBER

[76] Inventor: Thomas P. Burns, 4108 Meadowlark Rd., Eagan, Minn. 55122

[*] Notice: The portion of the term of this patent subsequent to Aug. 17, 2010 has been disclaimed.

[21] Appl. No.: 107,445

[22] Filed: Aug. 16, 1993

Related U.S. Application Data

[63] Continuation-in-part of Ser. No. 877,845, May 1, 1992, Pat. No. 5,235,777.

[51] Int. Cl.⁵ .............................................. A01K 91/00
[52] U.S. Cl. .................................. 43/43.14; 43/44.91
[58] Field of Search ................ 43/43.14, 17, 17.5, 43/44.92, 44.91, 44.9

[56] References Cited

U.S. PATENT DOCUMENTS

| | | | |
|---|---|---|---|
| 489 | 1/1896 | Allcock | 43/43.14 |
| 2,004,414 | 6/1935 | Menefee | 43/17 |
| 2,778,147 | 1/1957 | Peck, Jr. | 43/44.87 |
| 2,863,253 | 12/1958 | Hettinger | 43/43.14 |
| 2,872,752 | 2/1959 | Salzmann | 43/44.9 |
| 3,087,275 | 4/1963 | Svoboda | 43/44.91 |
| 3,102,359 | 9/1963 | Cahill et al. | 43/43.14 |
| 3,161,982 | 12/1964 | Lee | 43/44.91 |
| 3,359,674 | 12/1967 | Strumor | 43/42.06 |
| 3,670,447 | 6/1972 | Wohead | 43/43.14 |
| 3,688,431 | 9/1972 | Nichols et al. | 43/43.14 |
| 3,921,328 | 11/1975 | Holcombe | 43/17.6 |
| 3,990,172 | 11/1976 | Hagquist | 43/43.14 |
| 4,090,318 | 5/1978 | Webster | 43/43.14 |
| 4,418,492 | 12/1983 | Rayburn | 43/44.9 |
| 4,649,660 | 3/1987 | Kurka et al. | 43/17.5 |
| 4,656,777 | 4/1987 | Fernbach | 43/44.9 |
| 5,235,777 | 8/1993 | Burns | 43/43.14 |
| 5,241,774 | 9/1993 | Rayburn | 43/44.9 |

FOREIGN PATENT DOCUMENTS

| | | | |
|---|---|---|---|
| 2515204 | 10/1976 | Germany | 43/43.14 |
| 2757997 | 6/1979 | Germany | 43/17.6 |

*Primary Examiner*—P. Austin Bradley
*Assistant Examiner*—Chuck Y. Mah
*Attorney, Agent, or Firm*—Palmatier, Sjoquist & Helget

[57] ABSTRACT

A solid crush-proof hydrodynamic modular plastic double frustum-shaped fishing bobber has two opposing frustum-shaped end sections each with a parallel opposing face. At least two and possibly more opposing frustum-shaped intermediate sections are provided each with two parallel end faces and being of a larger diameter than the end sections. Releasable connecting means are on each face for securing the bobber sections together. Channels and slots may also be provided for connecting the fishing line to the bobber.

10 Claims, 3 Drawing Sheets

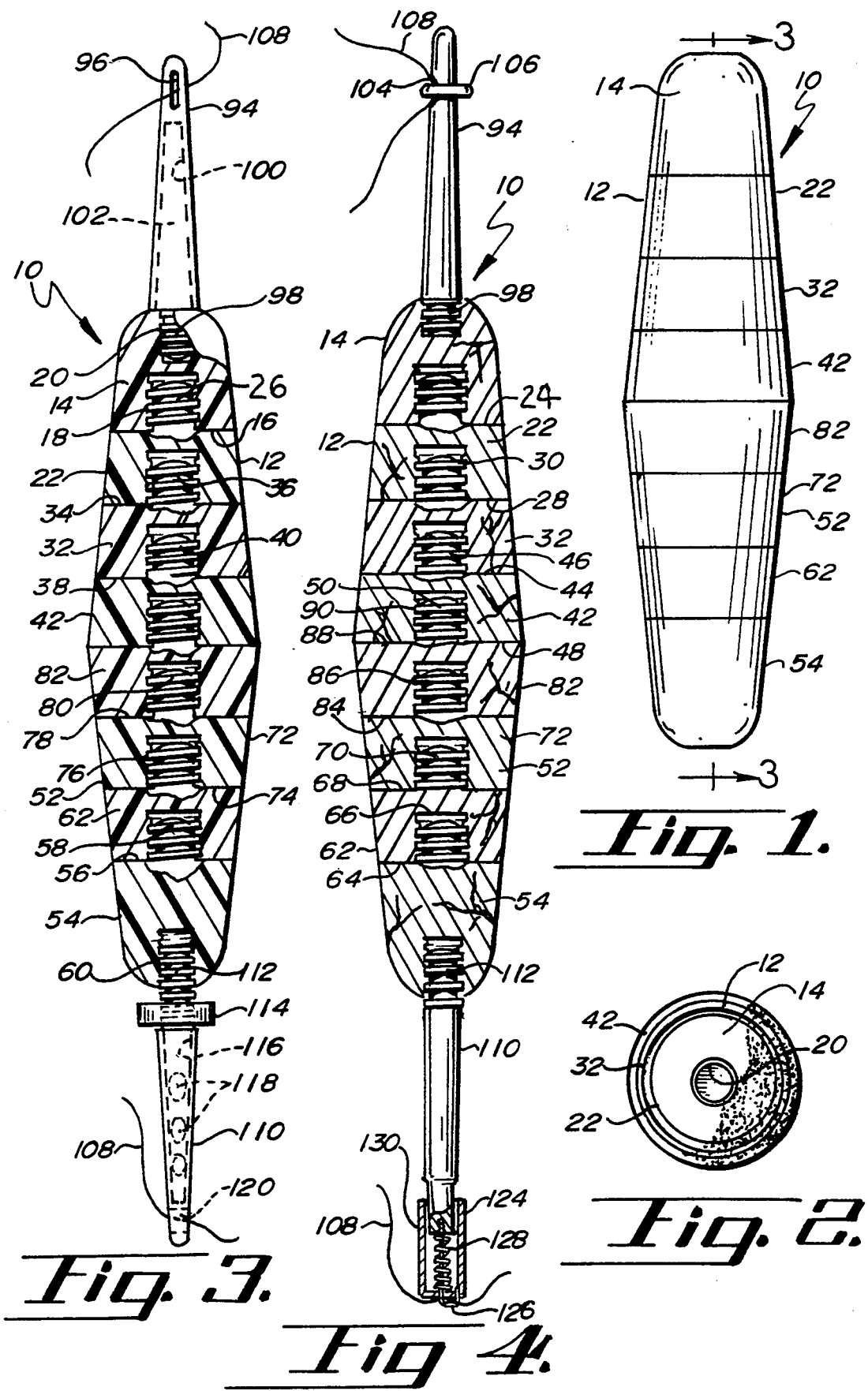

FISHING BOBBER

This application is a continuation-in-part of co-owned U.S. patent application Ser. No. 07/877,845, filed on May 1, 1992 for Fishing Bobber, now U.S. Pat. No. 5,235,777.

BACKGROUND OF THE INVENTION

This invention relates to a fishing bobber, and more particularly, to a solid hydrodynamic modular double frustum-shaped fishing bobber, which may be increased or decreased in size along with other significant advantages.

Fishing bobbers of many types, sizes and shapes have been available. Most bobbers have been of limited utility in that they have been adapted for fishing of one type and have not been effective in another or different type of fishing. Various types of fishing include fishing in still water with or without wind, fishing in a strong tide, fishing in a moving body of water, trolling perhaps in a boat or may be casting bait, hook or lure, line and bobber from any of the above situations.

One type of prior known bobber might be described as being cylindrical or spherical and may even be referred to as a "beach ball" bobber. Beach ball bobbers are hard for a fish to pull under due to a lack of hydrodynamic design in combination with these types of bobbers typically being oversized for the size of fish sought after. With these types of bobber arrangements, the fisherman may even miss the fish nibbling at the bait. Furthermore, these larger bobbers tend to wander from their desired location as they are more subject to wind, waves and currents.

Apart from the lack of sensitivity of prior known bobbers, many bobbers are of a lightweight construction which also hampers the fisherman when he attempts to cast his bait as far as possible. Sizable lightweight bobbers simply resist being thrown or cast very far. Consequently, a fisherman often will loose his bait from his hook because of the necessary whipping action. Hollow bobbers are also undesirable in that they are subject to being crushed when stepped on or compressed. Consequently, an avid fisherman is compelled to carry so many different sizes and shapes of bobbers in his tackle box that unnecessary tackle box space is consumed.

There is a need for a solid hydrodynamic modular fishing bobber that holds its place well in the wind, waves and currents, permits the fisherman to cast farther than previously known, is quite adjustably sensitive to even the lightest of bites or strikes, and takes only a single lure compartment within a tackle box.

SUMMARY OF THE INVENTION

A solid crush-proof hydrodynamic modular plastic double frustum-shaped fishing bobber has two opposing frustum-shaped end sections each with a parallel opposing face. At least two and possibly more opposing frustum-shaped intermediate sections are provided each with two parallel end faces and being of a larger diameter than the end sections. Releasable connecting means are on each face for securing the bobber sections together. Channels and slots may also be provided for connecting the fishing line to the bobber.

A principal object and advantage of the present invention is that is it a modular bobber that may be increased or decreased in size, thereby eliminating the need to carry a multiplicity of differently sized and shaped bobbers in a tackle box. The present invention fits in one lure compartment.

Another object and advantage of the present invention is its solid construction giving the bobber some weight which will permit the fisherman to cast his bait farther, more accurately and against the wind in a manner that the bait follows the bobber thereby achieving a lesser chance that the bait will come off the hook or lure.

Another object and advantage of the present invention is that it is hydrodynamic and smooth in configuration which offers little resistance to a fish pulling it under. The bobber may be weighted so that just a little bit sits above the water. If the fish are feeding upwardly, the float will advantageously rise up and out of the water as heretofore not known.

Another object and advantage of the present fishing bobber is that it is of a solid durable plastic construction thereby making it shatter and crush proof and further advantageously it will not permit water to leak into it and sink.

Another object and advantage of the present invention is that the bobber is easy to use and permits addition or subtraction of sections while on the fishing line.

Another object and advantage of the present invention is that the modular bobber is inexpensive to manufacture and its assembly is relatively simple.

other objects and advantages will become readily apparent upon review of the following figures, specification and appended claims.

BRIEF DESCRIPTION OF THE DRAWINGS

FIG. 1 is a side elevational view of the fishing bobber of the present invention;

FIG. 2 is a plan view of the invention as identically seen from both the top and the bottom;

FIG. 3 is a cross-sectional view taken along lines 3—3 of FIG. 1 showing the releasable connecting means and attachable stem features;

FIG. 4 is a cross-sectional view similar to FIG. 3 showing additional stem features and the bobber being constructed of wood;

DETAILED SPECIFICATION

Figures 5, 6, 7:
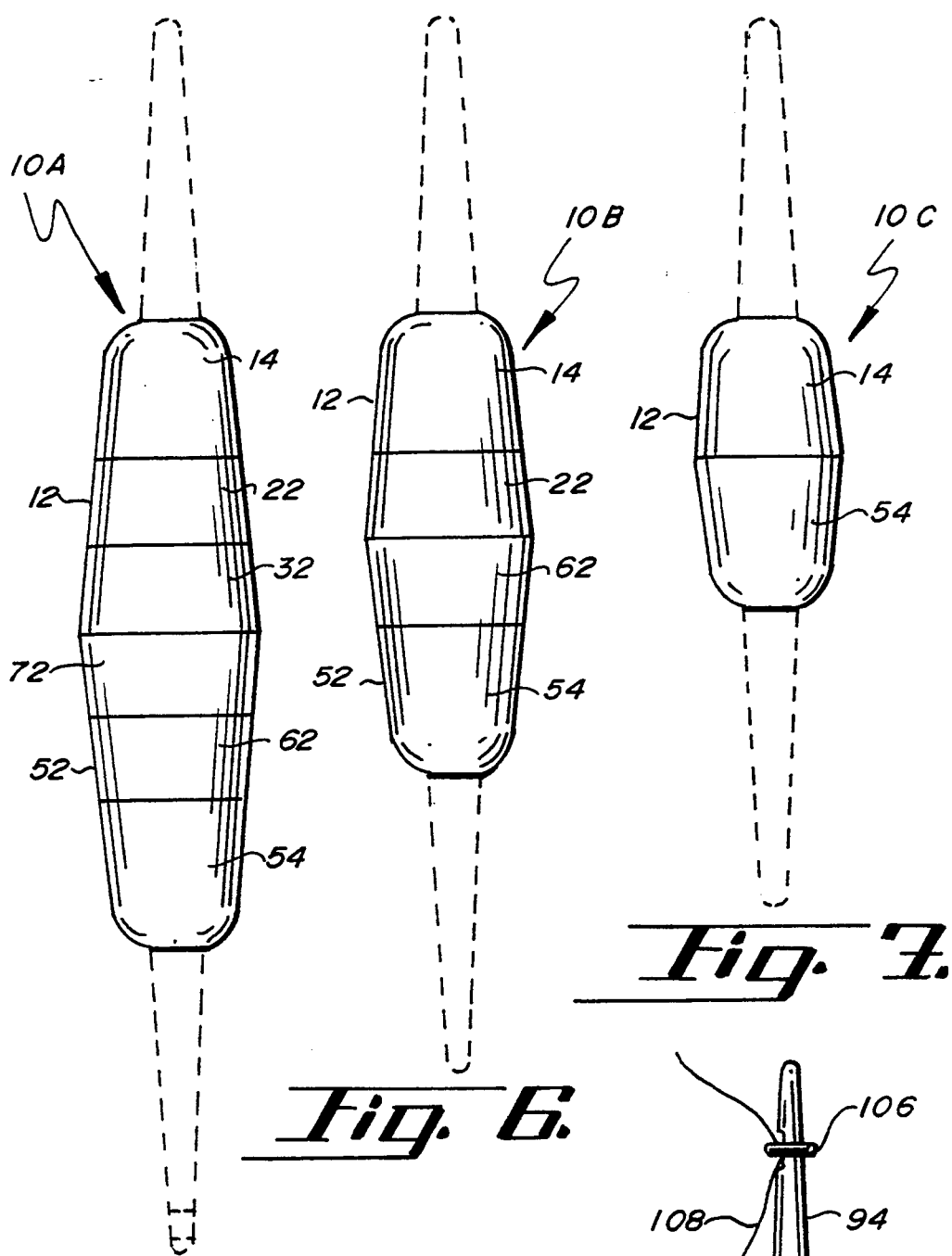
FIG. 5 is an elevational view similar to FIG. 1 with two opposing intermediate sections removed to reduce the size of the bobber.
FIG. 6 is an elevational view similar to FIG. 5 with an additional opposing pair of intermediate sections removed to further reduce the size of the bobber.
FIG. 7 is yet another reduced size of the bobber comprised of only the opposing end sections.

Referring to FIGS. 1–4, the fishing bobber 10 of the present invention may be seen to generally comprise a frustum-shaped upper half 12 comprised of an upper end section 14 and intermediate sections 22, 32 and 42 and a frustum-shaped lower half 52 including its lower end section 54 and lower intermediate 62, 72 and 82. Means, such as a threaded aperture and threaded shaft (18 and 26 for example) are provided for releasably connecting each bobber section together.

More specifically, the frustum-shaped upper half 12 is comprised of an upper end section 14 having an end face 16 with a threaded aperture 18 centrally located in the end face 16. Opposite the end face 16 is located a top side threaded aperture 20 as will be appreciated later. The first upper intermediate section 22 is comprised of an upper face 24 supporting a centrally located threaded shaft 26 and a lower face 28 with a centrally located threaded aperture 30. The second upper intermediate section 32 is comprised of an upper face 34 supporting a centrally located threaded shaft 36 and a lower face 38 with a centrally located threaded aperture 40. The third upper intermediate section also has an upper face 44 which supports a centrally located threaded shaft 46 and a lower face 48 with a centrally located threaded aperture 50.

The faces 16, 24, 28, 34, 38, 44 and 48 are all substantially parallel. The opposing or confronting faces appropriately support either threaded apertures 18, 30, 40 and 50 or threaded shafts 26, 36 and 46 respectively.

The frustum-shaped lower half 52 of the fishing bobber 10 is a mirror-image of the frustum-shaped upper half 12. The lower half 52 includes its lower end section 54 having an end face 56 supporting a centrally located threaded shaft 58. Opposite the end face 56 is located a bottom side aperture 60 as again will be appreciated later. The first intermediate section 62 is comprised of a lower face 64 supporting a centrally located threaded aperture 66 and an upper face 68 supporting a threaded shaft 70 centrally. The second intermediate section 72 has a lower face 74 with a centrally located threaded aperture 76 and an upper face 78 supporting a centrally located threaded shaft 80. The third lower intermediate section 82 has a lower face 84 with a centrally located threaded aperture 86 and an upper face 88 supporting a threaded shaft 90.

It will be appreciated that the diameters of the upper end section 14 and the lower end section 54 are smaller than the first upper and lower intermediate sections 22 and 62. The diameter of the fishing bobber 10 also increases as we approach the central regions with the addition of the second and third upper and lower intermediate sections 32, 72, 42 and 82.

The faces 56, 64, 68, 74, 78, 84 and 88 are all substantially parallel. The opposing or confronting faces appropriately support either threaded apertures 66, 76 and 86 or threaded shafts 58, 70, 80 and 90.

The fishing bobber 10 sections are appropriating frustum-shaped as to create a smooth hydrodynamic outer surface in a pen-like structure. This is especially important so that the bobber is highly reactive to the nibbles of a fish and yet remains smooth and contoured when any number of the cooperating intermediate sections 22, 32, 42, 62, 72 or 82 are removed. It should be apparent that all of the sections screw together and do not require any detailed assembly of any sort. This shape is particularly unique in that it provides the centrally located center of gravity along with the hydrodynamic detail that only a double frustum-shaped bobber could have to provide the unique advantages of the present invention.

The fishing bobber 10 of the present invention is suitably made of a solid plastic material having a specific gravity less than that of water (1.0) such as approximately 0.64. Such appropriate plastics might be acrylonitrile butadiene styrene, nylon, polycarbonate, polyethylene, polyphenylene oxide, polyacetal, polyester, polypropylene or a high-density or impact polystyrene, with a suitable 2% foaming agent, such as azodicarbonamide. Consequently, the bobber indeed has some weight while yet a unique ability to float in water. By this arrangement, when a fisherman casts his bait, the bobber pulls the bait as opposed to snapping or whipping the bait just before the point of release during casting which may rip the bait off the hook or lure. As shown in FIG. 4, the fishing bobber 10 may also be made suitably out of wood which has a specific gravity less than water.

Referring to FIGS. 3 and 4, the upper end section 14 at its top side threaded aperture 20 may suitably receive and support an upper stem 94. Stem 94 has a slot 96 at its upper end while its lower end 98 is threaded. Stem 94 suitably may have a cavity 100 therein for receiving a glowing phosphorescence, fluorescent or light stick matter 102 provided that the stem 94 is transparent or translucent to light. The stem 94 may also support a notch 104 at its upper end where suitably a grommet or O-ring 106 of rubber may be held thereat. By this arrangement the fishing line 108 may be passed between the stem 94 and O-ring 106 at the notch 104 and is generally held in place by the rubber O-ring or grommet 106.

The lower end section 54 also suitably has its bottom side aperture arranged to receive and support a lower stem 110 which may be of a similar construction as upper stem 94. Lower stem 110 includes its threaded end 112 which extends beyond and outwardly from the lower end section 54 as to receive a threaded washer-like weight 114. Stem 110 may also have a cavity 116 for receiving shots or weights 118 as are common in a tackle box. Stem 110 may also have a slot 120 with perhaps a spring (not shown) to further secure the fishing line 108 thereat.

FIG. 4 shows another version of a line securing means 124 comprised of a hooked shaft 126 fixed into the lower end of the lower stem 110. A coil spring 128 is around the shaft 126, both of which are covered by a cap 130. By this arrangement the line 108 may be passed through the distal end of the shaft hook and held thereat by action of the cap 130, spring 128 and the shaft 126 being fixed into the lower stem 110.

Referring to FIGS. 5, 6 and 7, the fishing bobber 10 of the present invention may be shown as it is reduced in size 10A, 10B and 10C. The reduction in bobber 10 size for FIG. 5 is simply the removal of the third upper and lower intermediate sections 42 and 82. With respect to FIG. 6, the second upper and lower intermediate sections 32 and 72 are also removed. With respect to FIG. 7, the first intermediate sections 22 and 62 are also removed leaving only the upper and lower end sections 14 and 54. By the removal or addition of intermediate sections, a fisherman need only have one bobber that is hydrodynamic in design while yet only takes up one lure compartment within his fishing tackle box.

Figure 8:
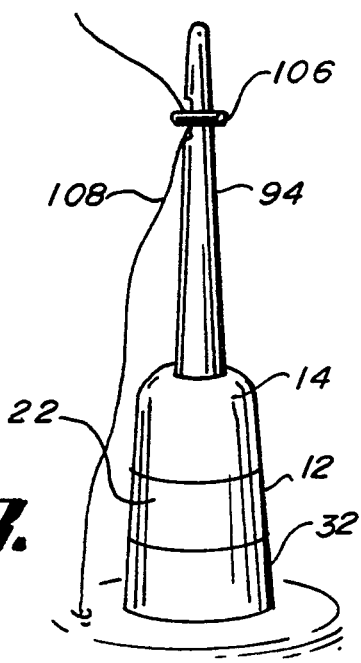
FIG. 8 is a perspective view of the fishing bobber of the present invention.

Referring to FIGS. 3 and 8, the operation of the bobber may be seen. Ideally the fisherman wants a small portion of the bobber 10 to be above the surface. In this condition, the bobber is highly sensitive to nibbles and strikes of even the smallest of fish. To achieve this goal, a fisherman may add shot 118 into cavity 116 of the lower stem 110. Additionally, the fisherman may add a threaded weight 114 onto the threaded end 112 of the lower stem 110. The opposite is also true in that removal of the weights 118 and 114 will permit a fisherman to add a heavier lure perhaps with additional weights below the water onto the line adjacent the lure. Consequently, the sensitivity of the bobber to any of a variety of fish and fishing conditions is easily achieved.

Figure 9:
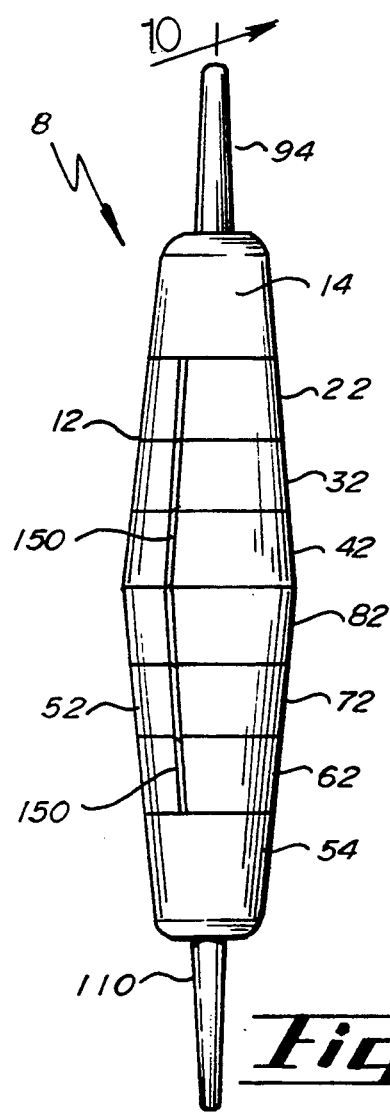
FIG. 9 is a side elevational view of the modified fishing bobber.
Figure 10:
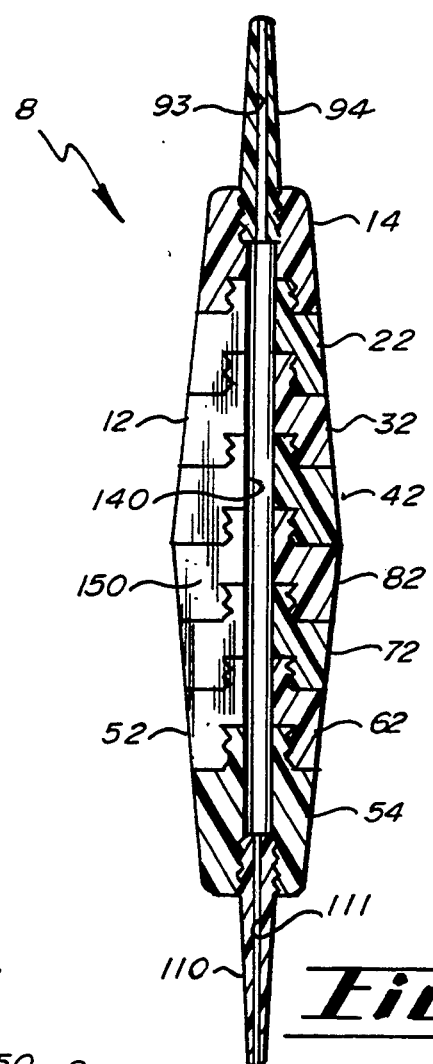
FIG. 10 is a cross-sectional view taken along lines 10—10 of FIG. 9.
Figure 11:
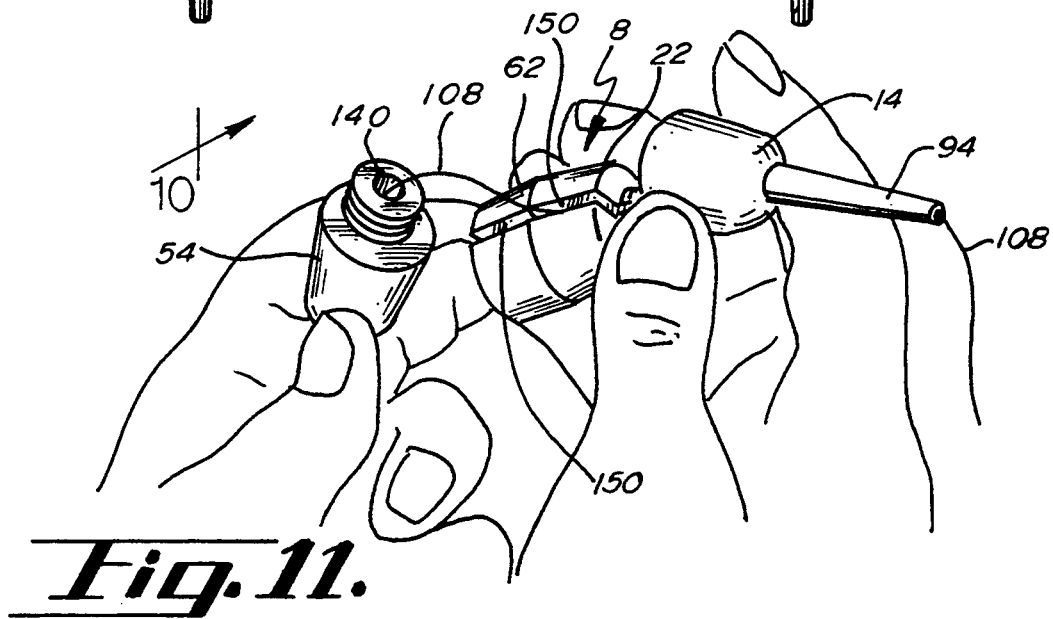
FIG. 11 is a perspective view showing the assembly of the bobber by the fisherman.

Referring to FIGS. 9 through 11, bobber 10 may be modified to bobber 8 with axial channels 93, 111 and 140 extending through upper stem 94, lower stem 110, upper half 12 and lower half 52 for securing the bobber onto the fishing line 108. A knot or weight may be used to secure the bobber 8 at a particular position on the line 108. Intermediate sections 22, 32, 42, 82, 72 and 62 may each have a slot 150 through to channel 140 so that the intermediate sections may be easily added and removed from the fishing line 108 as shown in FIG. 11.

The present invention may be embodied in other specific forms without departing from the spirit or essential attributes thereof; therefore, the illustrated embodiments should be considered in all respects as illustrative and not restrictive, reference being made to the appended claims rather than to the foregoing description to indicate the scope of the invention.

I claim:

1. A solid crush-proof modular double frustum-shaped fishing bobber attachable to a fishing line, comprising:
   (a) two opposing frustum-shaped end sections each with a parallel opposing face made of a heavy solid rigid foamed plastic chosen from a group comprising polystyrene, acrylonitrile butadiene styrene, nylon, polycarbonate, polypropylene, polyethylene, polyphenylene oxide, polyacetal and polyester, the plastic having a specific gravity less than that of water;
   (b) at least two opposing frustum-shaped intermediate sections each with two parallel end faces made of the plastic; and
   (c) releasable connecting means on each face for securing the bobber sections together for farther and more accurate casting and care of the bait which follows the bobber when casting.

2. The bobber of claim 1, wherein the bobber has a channel therethrough for receiving the fishing line extending through the end and intermediate sections.

3. The bobber of claim 1, wherein the intermediate sections have a larger diameter than a diameter of the end sections.

4. The bobber of claim 1, wherein the releasable connecting means comprises a combination of a threaded protruding shaft and a cooperating threaded aperture each respectfully on opposing faces.

5. The bobber of claim 1, further comprising an aperture in each end section opposite the end section face adapted to receive a hollow stem which receives the fishing line therethrough.

6. The bobber of claim 1, further comprising a channel through the bobber for receiving the fishing line extending through the end and intermediate sections and slots in the intermediate sections extending through to the channel for passage of the fishing line to and from the channel.

7. The bobber of claim 6, wherein the slots are alignable.

8. A solid hydrodynamic modular fishing bobber attachable to a fishing line, comprising:
   (a) two opposing end sections with an axial channel therethrough, each section having a parallel opposing face and means opposite the face to receive and support a hollow stem for receiving the fishing line through the stem and channel;
   (b) at least two opposing intermediate sections each with two parallel end faces, an axial channel therethrough and a slot extending through to the channel for passage of the fishing line to and from the channel; and
   (c) releasable connecting means on each face for securing the bobber sections together.

9. The bobber of claim 8, wherein the bobber is made of a heavy solid rigid foamed plastic chosen from a group comprising polystyrene, acrylonitrile butadiene styrene, nylon, polycarbonate, polypropylene, polyethylene, polyphenylene oxide, polyacetal and polyester, the plastic having a specific gravity less than that of water.

10. The bobber of claim 8, wherein the sections are hydrodynamically frustum-shaped.

* * * * *